United States Patent
Shin

(10) Patent No.: US 12,474,955 B2
(45) Date of Patent: Nov. 18, 2025

(54) METHOD AND APPARATUS WITH SIDECAR PATTERN CHECKPOINTING

(71) Applicant: SAMSUNG ELECTRONICS CO., LTD., Suwon-si (KR)

(72) Inventor: Sanggyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/113,408

(22) Filed: Feb. 23, 2023

(65) Prior Publication Data

US 2024/0095066 A1    Mar. 21, 2024

(30) Foreign Application Priority Data

Sep. 15, 2022  (KR) .................. 10-2022-0116539

(51) Int. Cl.
  *G06F 9/48* (2006.01)
  *G06F 9/54* (2006.01)

(52) U.S. Cl.
  CPC ............ G06F 9/4881 (2013.01); G06F 9/485 (2013.01); G06F 9/54 (2013.01)

(58) Field of Classification Search
  None
  See application file for complete search history.

(56) References Cited

U.S. PATENT DOCUMENTS

| | | | |
|---|---|---|---|
| 10,031,819 B2 | 7/2018 | Banerjee et al. | |
| 10,216,587 B2 | 2/2019 | Hasanov et al. | |
| 10,705,914 B2 | 7/2020 | Zhao et al. | |
| 10,938,891 B2 | 3/2021 | Dasgupta et al. | |
| 2015/0006487 A1 | 1/2015 | Yang et al. | |
| 2022/0091874 A1 | 3/2022 | Janakiram et al. | |
| 2024/0195779 A1* | 6/2024 | Komu ................. | G06F 9/45558 |

OTHER PUBLICATIONS

Ahmed et al. "Docker Container Deployment in Distributed Fog Infrastructures with Checkpoint/Restart" *2020 8th IEEE International Conference on Mobile Cloud Computing, Services, and Engineering(MobileCloud)*. IEEE, Apr. 2020 (pp. 1-9).

* cited by examiner

*Primary Examiner* — Scott C Sun
(74) *Attorney, Agent, or Firm* — NSIP Law

(57) ABSTRACT

A method including, for each of a plurality of job nodes, corresponding to a job request of a scheduler node, distributing an application container and a sidecar container of a corresponding job node of the plurality of job nodes, and storing, by the sidecar container, information about a respective state of the application container in a memory through a communication between the sidecar container and at least one sidecar container of another job node of the plurality of job nodes.

19 Claims, 6 Drawing Sheets

METHOD AND APPARATUS WITH SIDECAR PATTERN CHECKPOINTING

CROSS-REFERENCE TO RELATED APPLICATIONS

This application claims the benefit under 35 USC § 119(a) of Korean Patent Application No. 10-2022-0116539, filed on Sep. 15, 2022, in the Korean Intellectual Property Office, the entire disclosure of which is incorporated herein by reference for all purposes.

BACKGROUND

1. Field

The following description relates to a method and apparatus with sidecar pattern checkpointing.

2. Description of Related Art

Typically, in a high-performance computer environment where a scheduler program manages a job, when the job is interrupted in the middle of a process by an unexpected issue in a processor, checkpointing and restart functions are used to solve the issue. Checkpointing refers to storing a current state of a process, and a restart refers to reconstructing and re-executing the process in the stored state. Typically, sidecar patterns are employed in logging, monitoring, or HyperText Transfer Protocol over Secure Socket Layer (HTTPS) communication to collect the logs outside the container. The sidecar patterns may reduce interdependence with the application container, and the application container may be unaffected even if a failure occurs in the sidecar container.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a method including, for each of a plurality of job nodes, corresponding to a job request of a scheduler node, distributing an application container and a sidecar container of a corresponding job node of the plurality of job nodes, and storing, by the sidecar container, information about a state of the application container in a memory through a communication between the sidecar container and at least one sidecar container of another job node of the plurality of job nodes.

The method may also include detecting for an error, by checkpointing performed by one or more of the sidecar containers, based on at least one communication of the communications and performing a restart in response to the detected error.

The performing of the restart may include stopping an ongoing job in response to the detected error within a respective one of an application container and sidecar container of one job of the plurality of job nodes, requesting an allocation of a new node to the scheduler node, and performing, by the scheduler node, a migration of the one application container and the one sidecar container to the new node.

The performing of the restart may include first loading, for each remaining job node other than the one job, the stored information in the memory about the state of the application container and second loading, by a corresponding sidecar container of the new node, the information about the state of the migrated one application container from the memory.

The method may also include securing the plurality of job nodes in response to the job request, and the performing of the restart may include restarting the remaining nodes and the new node upon completion of the first and second loadings.

The distributing, for each of the plurality of job nodes, of the application container and the sidecar container may include setting the application container and the sidecar container so that the application container and the sidecar container perform a job independently of respective application containers of remaining job nodes other than a job node that includes the application container and the sidecar container.

The distributing, for each of the plurality of job nodes may include forming at least one pod respectively including at least one job node of the plurality of job nodes and designating, to each of the at least one pod, a corresponding sidecar container in charge of at least one adjacent application container.

The method may include determining whether a number of the plurality of job nodes is greater than or equal to a threshold value and forming the plurality of job nodes into a plurality of groups in response to the number of the plurality of job nodes being greater than or equal to the threshold value, and designating at least one representative node among the plurality of groups, and that respective sidecar containers included, by the distributing, in the at least one representative node are configured to communicate with respective other sidecar containers included in representative other nodes of another group.

The storing, for each of the plurality of job nodes, of the information about the state of the application container may include sharing and storing the information about the state of the application container and information about a state of the sidecar container both in a same memory.

In another general aspect here is provided a non-transitory computer-readable storage medium storing instructions that, when executed by a processor, cause the processor to perform the method.

In another general aspect, here is provided an electronic device system including one or more memories, one or more processors, that operate as a scheduler node, configured to transmit a job request, and that the one or more processors or other one or more processors, that operate as computation nodes, are configured to secure a plurality of job nodes based on the job requests received from the scheduler node, and, for each of a plurality of job nodes corresponding to the job request distribute an application container and a sidecar container corresponding to the application container, with the distributed sidecar container being configured to communicate with another sidecar container of at least one other job node of the plurality of job nodes and store information about a state of the application container in the one or more memories.

The sidecar container may be configured to detect a failure through the communication and perform a restart.

The sidecar container may include a container provisioned with a programming language that is different from a corresponding application container of the application containers.

The sidecar container may be configured to stop an ongoing job and request an allocation of a new node to the scheduler node in response to an error occurring and the scheduler node may be configured to perform a migration to the new node and perform the restart.

The sidecar container may be configured to perform a migration in which information about a state of the application container is loaded from the storage nodes to the new node.

The scheduler node may be configured to set the application container and the sidecar container so that the application container and the sidecar container perform a job independently.

The scheduler node may be configured to form at least one pod including the job nodes and designate the sidecar container in charge of at least one adjacent application container to the pod.

The scheduler node may be configured to determine whether a number of the plurality of job nodes is greater than or equal to a threshold value, form the plurality of job nodes into a plurality of groups in response to the number of the plurality of job nodes being greater than or equal to the threshold value, and designate at least one representative node among the plurality of groups, that sidecar containers included in the at least one representative node are configured to communicate with sidecar containers included in representative nodes of another group.

The computation nodes may be configured to share and store the information about the state of the application container and information about a state of the sidecar container in a same storage unit.

In another general aspect, here is provided a computing apparatus including one or more processors configured to store state information, in a memory, corresponding to one application container of a plurality of application containers corresponding to a received job request, checkpoint, by at least one sidecar container among a plurality of sidecar containers corresponding to the job request, the one application container and/or one sidecar container, among the plurality of sidecar containers, corresponding to the one application container, and perform, based on a detection an error or failure by the checkpoint, the job using a migrated one application container and the stored state information, and the migrated one application container is a result of a migrating of the one application container to correspond to a distributed sidecar container different from the plurality of sidecar containers.

For the checkpoint, the one or more processors may be further configured to perform communication between the at least one sidecar container and the one sidecar container.

For the checkpoint, the one more processors may be further configured to monitor, by the at least one sidecar container or another at least one sidecar container among the plurality of sidecar containers, the one application container and the one sidecar container for the error or failure, the migrated one application container being an application container of a job node having the distributed sidecar container, where the job node is different from a previous job node that included the one application container and the one sidecar container, and, in response to the detection of the error or failure, the one or more processors are further configured to load the state information of the one application container from the memory to the new job node.

Other features and aspects will be apparent from the following detailed description, the drawings, and the claims.

Figure 1:
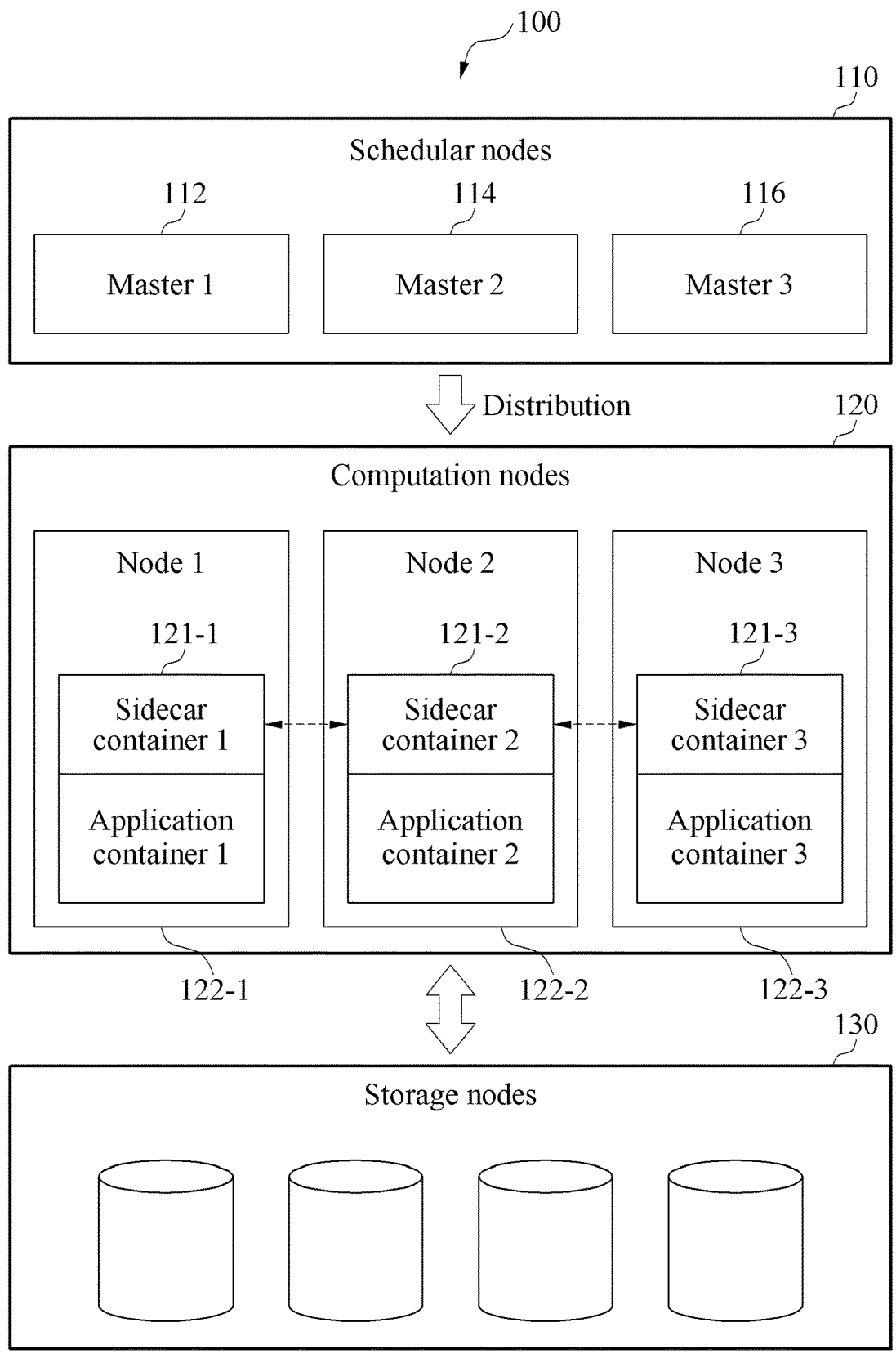
FIG. 1 illustrates an example of a computer device according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C', and the like are intended to have disjunctive meanings, and these phrases "at least one of A, B, and C", "at least one of A, B, or C', and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Jobs handled by a high-performance computer, for example, are typically performed by a process unit, and a scheduler or a controller to manage the jobs that may exist. An example of a main characteristic of applications handled by the high-performance computer is that one large job may be divided and performed by several nodes. Large jobs may have many computing jobs, and each job that made up the large job may typically take a long period time to be completed. As such, large jobs typically consume a lot of resources and require a lot of time, when there is a stoppage that occurs due to an unexpected problem during a processing the job, a fatal delay may typically occur.

For example, in a typical scheduler of a high-performance computer, an external tool supporting checkpointing/restarting (C/R) for each process is provided to control multiple jobs and/or nodes. However, typically, if the typical central controller manages the C/R for all pending and executed jobs, an overload error, or other problems, occur because the central controller is controlling too many jobs and/or too many nodes at the same time. In the typical scheduler of the high-performance computer, when a problem occurs in the central controller, the entire C/R function is also typically affected. In addition, in such typical operations, it is important to determine a correct timing of the error where the timing could be checked by checking the state of the memory or the state network of the corresponding application at the moment of checkpointing. However, it is difficult to check the state of the application of each node for the central controller, and even if these states are checked, the state of the process can change very quickly. For example, any number of these states may change during a process of handshaking over the network.

In addition to these high-performance computers, typical container-based cloud servers may also have schedulers with similar drawbacks. Characteristics of a typical cloud based job may include that a corresponding microservice architecture mainly includes containers, simple jobs are executed, and execution time is relatively short. However, for a scheduler or an orchestration of jobs in a cloud environment, C/R is usually unimportant or not available due to the characteristics of the main job. Even when C/R is available in such a typical environment, a central master of the cloud server monitors and controls job states of all processes, as in the high-performance computer, to perform the C/R.

In high performance computer systems, such as supercomputers, efficient scheduling and restarting of jobs may be desirable to maintain a desired level of output.

FIG. 1 illustrates an example of a computer device according to one or more embodiments.

As illustrated in FIG. 1, one or more of the illustrated blocks and a combination thereof may be implemented by a hardware-based computer that executes (or performs) computer instructions to configure the computer to perform the same.

The computer device (e.g., high performance computers) according to an example may include a scheduler system 100 capable of performing a checkpointing/restart (C/R) by using sidecar patterns. Hereinafter, while examples will be provided where the computing device is a high-performance computer, such descriptions are for explanatory purposes and are not intended to limit embodiments or operations/method to such high performance computers. Such a high-performance computer (e.g., supercomputer) may have a large processing capacity (e.g., operation speed) compared to general-purpose computers.

The scheduler system 100 according to an example may include scheduler nodes 110, computation nodes 120, and storage nodes 130 as agents. The scheduler nodes 110 and the computation nodes 120 may be respectively representative of different distributed processing devices, each having one or more processors, different processors, and/or different or overlapping collections of processors and/or portions of the processors. For example, a computation node 120 may be one or more processors that operate as an agent, and a scheduler node 110 may be one or more processors that operate as an agent. The scheduler nodes 110 may also be representative of a central controller. Such nodes included in the scheduler system 100 of the examples are not limited to the nodes described above, and may be various types of nodes, such as processors or hardware processing units/elements (PUs) of one or more graphics processing units (GPUs) or processors or hardware processing units/elements (PUs) of one or more network processing units (NPUs). The storage nodes 130 may be respective memories and/or respective portions of one or more memories. The scheduler system 100 is described in detail below with reference to FIGS. 2 to 5.

When the scheduler node 110 according to an example receives a job request to be processed, a master node, such as Master 1 112, Master 2 114, and Master 3 116, may secure nodes for necessary resources and may distribute application containers 122-1 to 122-3 to secured nodes. Here, the scheduler node 110 according to an example may also distribute sidecar containers (C/R containers) 121-1 to 121-3 which perform C/R functions.

The computation nodes 120 according to an example may include a plurality of job nodes (e.g., node 1 to node 3). In addition, the plurality of job nodes (e.g., node 1 to node 3) of the computation nodes 120 may also include a sidecar container (e.g., 121-1 to 121-3) and an application container (e.g., 122-1 to 122-3). Although the computation nodes 120 are illustrated as including three job nodes in an example of the present disclosure, the number of job nodes, sidecar containers, and application containers may vary depending on design.

The scheduler system 100 according to an example may help address or resolve the problem of stopped jobs, through C/R functions. Checkpointing may refer to the storing of the current state of the process in the disk, or other memory device, and restarting may refer to reconstructing and re-executing the process in or from the stored state.

The scheduler system 100 according to an example is not a method in which the central controller directly performs C/R for all containers. Instead, in an example, the scheduler system 100 may apply sidecar patterns which generate a sidecar container to assist the C/R process for each, or many, containers and may also transfer an authority associated with the application container and/or the sidecar container.

More specifically, each node included in the computation nodes 120 according to an example may perform the C/R process in the sidecar patterns. The sidecar patterns may add the sidecar containers 121-1 to 121-3, which may operate independently, to the application containers 122-1 to 122-3, which perform the job. The sidecar patterns may be used to execute logging, monitoring, or hypertext transfer protocol (HTTPS) communication to collect the logs outside the container.

More specifically, the sidecar containers 121-1 to 121-3 according to an example may operate independently without changing or modifying the application containers 122-1 to 122-3 and may be added to or removed from the application containers 122-1 to 122-3. By using the sidecar patterns, it is possible to reduce the interdependence between the sidecar containers 121-1 to 121-3 and the application containers 122-1 to 122-3, and the application containers 122-1 to 122-3 may be unaffected even if failure occurs in the sidecar containers 121-1 to 121-3. In addition, it is possible to apply, change, or remove only the sidecar containers 121-1 to 121-3 without modifying the application containers 122-1 to 122-3 under execution. By assigning the sidecar containers 121-1 to 121-3 with the C/R of the application containers 122-1 to 122-3, the workload of the central controller (e.g., the scheduler nodes 110) may be divided or delegated to the sidecar containers 121-1 to 121-3.

In some examples, each sidecar container 121-1 to 121-3 and application containers 122-1 to 122-3 may be provisioned or configured to perform operations according to one or more programming languages. Thus, in a first sidecar container, such as sidecar container 121-1, a first programming language such as a C++, or C, may be employed while in a second sidecar container, such as sidecar container 121-2, another programming language, such as FORTAN, as non-limiting examples, may be used to perform its operations for the job. In some examples, a respective sidecar may operate with a different programming language than its respective application container. In some embodiments, other computing languages, such as Python may be employed.

In order for the scheduler system 100 to process a large job in the high-performance computer according to an example, a plurality of application containers 122-1 to 122-3 may be distributed across a plurality of nodes. Here, each of the plurality of sidecar containers 121-1 to 121-3 may be distributed to each of the plurality of nodes. The application containers 122-1 to 122-3 and the sidecar containers 121-1 to 121-3 included in each of the plurality of nodes may be referred to as one pod. Each pod of a plurality of pods may perform checkpointing at a same time through a communication that takes place between the sidecar containers 121-1 to 121-3 where this communication does not involve or take place through the scheduler nodes 110. The sidecar containers 121-1 to 121-3 may check the memory usage or CPU usage, as well as a device usage of the application containers 122-1 to 122-3, of which the sidecar containers 121-1 to 121-3 are in charge, and may determine the appropriate time for checkpointing by also checking the network state of the corresponding node. Since the sidecar containers 121-1 to 121-3 are containers executed together with the application containers 122-1 to 122-3, the determination of the state of the nodes and the application containers 122-1 to 122-3 may be fast and accurate.

For example, when the sidecar container 121-1 performs checkpointing, each of the plurality of sidecar containers 121-2 and 121-3 may communicate with each other at a predetermined time to perform checkpointing, request the respective application containers 122-1 to 122-3 to stop the job, and extract the information about the state of the application containers necessary for restarting the stopped process and store the information in the storage nodes 130. When the sidecar container 121-1 restarts, the stored information about the state of the application container 122-1 may be retrieved from the storage nodes 130, and the application container 122-1 may be executed.

Figure 2:
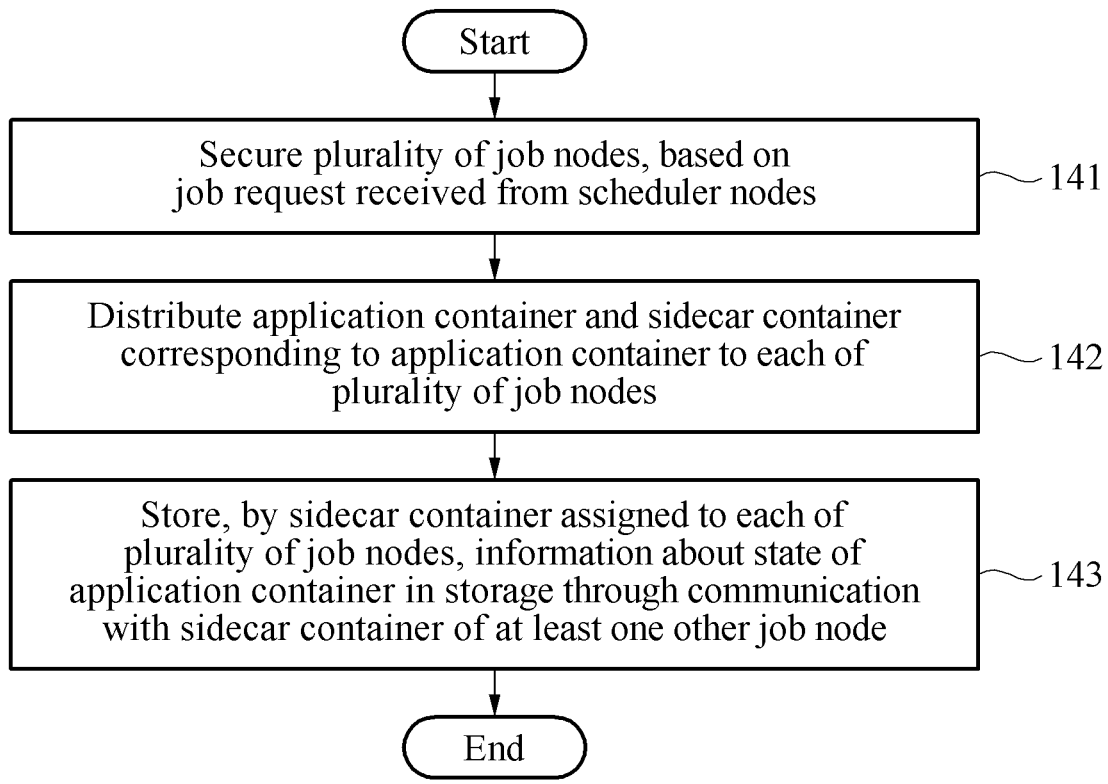
FIG. 2 illustrates an example of a control method of the computer device according to one or more embodiments.

FIG. 2 illustrates an example of a control method of a computer device, e.g., a high-performance computer, according to one or more embodiments.

Operations of FIG. 2 may be performed in the shown order and manner. However, the order of some operations may be changed, or some operations may be omitted, without departing from the spirit and scope of the shown example. Many of the operations shown in FIG. 2 may be performed in parallel or concurrently.

Referring to FIG. 2 and as a non-limiting example, the high performance computer may be the high performance computer of FIG. 1, and thus operations 141 to 143 may be performed by the high-performance computer described with reference to FIG. 1, and the description with reference to FIG. 1 may be applied to the description with reference to FIG. 2. Repeated description may be omitted.

In operation 141, the high-performance computer according to an example may secure a plurality of job nodes, based on the job request received from the scheduler nodes 110.

For example, the scheduler nodes 110 may request the computation nodes 120 to secure a plurality of job nodes (e.g., node 1 to node 3 of FIG. 1), and the computation nodes 120 may secure the plurality of job nodes based on the received job request.

In operation 142, the high-performance computer according to an example may distribute the application container and the sidecar container in charge of a C/R function corresponding to the application container to each of the plurality of job nodes. The distributed sidecar containers (e.g., 121-1 to 121-3 of FIG. 1) may communicate with each other and periodically perform checkpointing at a predetermined time, according to a predetermined schedule, at predetermined operational milestones, or other timing events.

In operation 143, the sidecar container assigned to each of the plurality of job nodes in the high-performance computer according to an example may store the information about the state of the application container in a storage unit through communication with the sidecar container of at least one other job node. The storage unit may include the storage nodes described above. The computation nodes 120 according to an example may share and store the information about the state of the application container and the information about the state of the sidecar container in the same storage unit.

Figure 3:
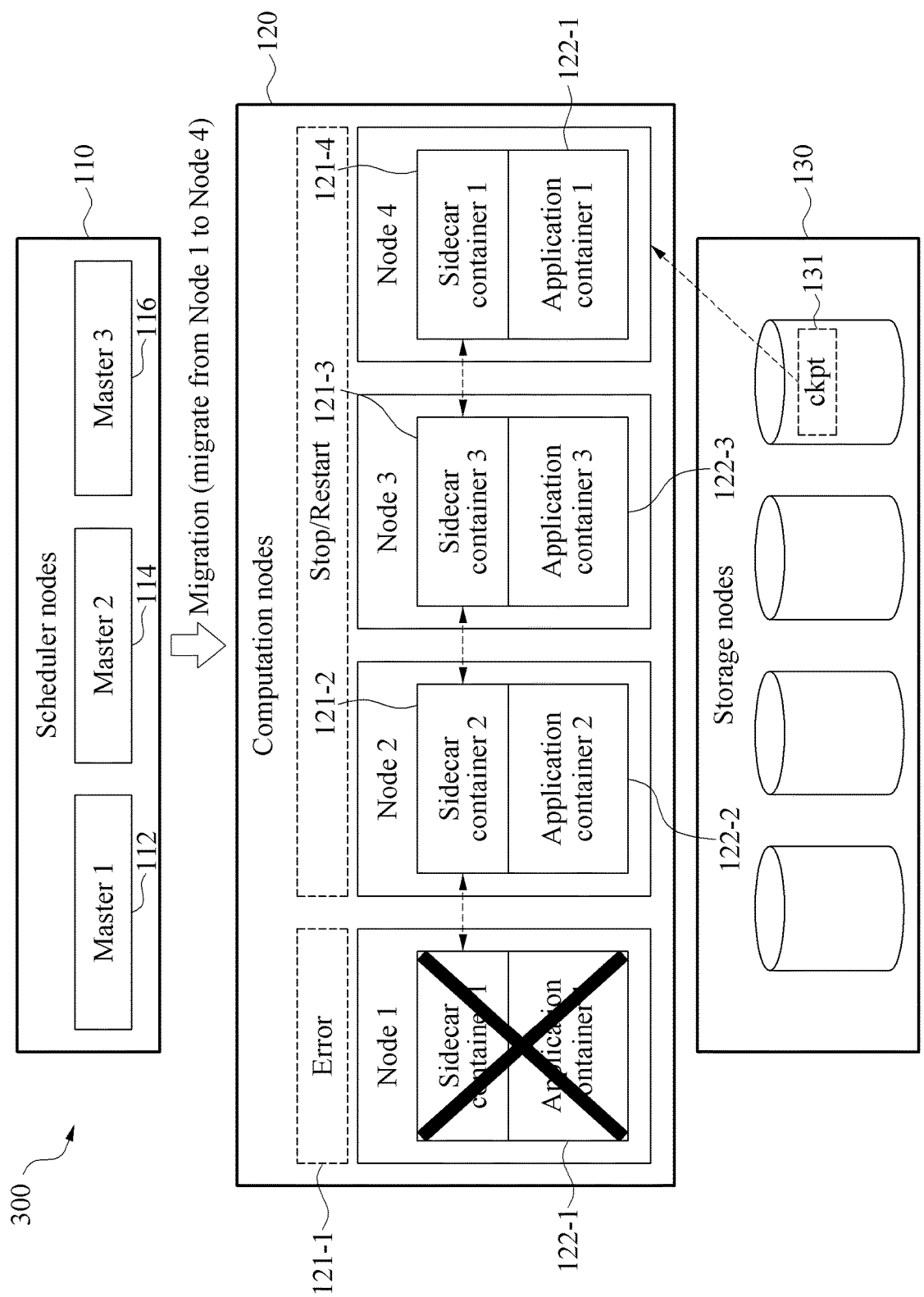
FIG. 3 illustrates the computer device performing a restart according to one or more embodiments.

FIG. 3 illustrates a computer device performing a restart according to one or more embodiments.

As illustrated in FIG. 3, one or more blocks and a combination thereof may be implemented by a special-purpose hardware-based computer that performs a predetermined function, or a combination of computer instructions and special-purpose hardware where the special purpose hardware is configured by execution of the computer instructions by one or more processors, for example.

The description with reference to FIGS. 1 and 2 may be applied to the description with reference to FIG. 3, and repeated description may be omitted. For example, the computing device may be any one of the high performance computers of FIGS. 1 and 2.

Referring to FIG. 3, a system 300 (e.g., the scheduler system 100 of FIG. 1) according to an example may perform a container migration and a restart of the job in the computation nodes 120. Migration according to an example may refer to migrating the application container (e.g., 122-1) to another physical node (e.g., node 4).

For example, each of the existing sidecar containers 121-1 to 121-3 may periodically check or monitor the state of the application containers 122-1 to 122-3 in charge to check whether the existing application containers 122-1 to 122-3 are operating normally.

The sidecar containers 121-1 to 121-3 according to an example may detect a failure in the job of existing application container or the existing sidecar container through their communication with each other and may perform the restart of the job. When an error occurs, the existing sidecar containers 121-2 to 121-3 may stop the ongoing job and may request an allocation of a new node to the scheduler nodes 110, and the scheduler nodes 110 may perform a migration of the job to the new node. The error may include an overload error, a failure of an application container or sidecar container to perform one or more operations related to the job, or a failure where the application container or sidecar container has taken too long to perform an operation, as non-limiting examples. A sidecar container may retrieve the information about the state of that container for the new node.

For example, when a failure occurs in the existing application container 122-1 under execution and the entire job needs to be stopped, the existing sidecar container 121-1 may submit a migration request to the scheduler nodes 110.

The scheduler nodes 110 that received the migration request may secure a new node (e.g., node 4) for migration, distribute the existing sidecar container 121-1 to the secured new node, and perform peer discovery so that the new sidecar container 121-4 may be connected to the existing sidecar containers 121-2 and 121-3. When the plurality of sidecar containers 121-2 to 121-4 are connected to each other, each of the sidecar containers 121-2 to 121-4 may retrieve the information about the state most recently checkpointed from the storage nodes 130 to perform restarting.

When the sidecar containers 121-2 to 121-4 are connected to each other and in charge of C/R, there may be no need for the master nodes (master 1 to master 3) of the scheduler nodes 110 to additionally restart the application containers 122-1 to 122-3, so the workload of the scheduler nodes 110 may be reduced. That is, sidecar containers may proactively determine a failure and make requests without the scheduler nodes 110 periodically checking whether a failure occurred in the application container.

According to an example, before the plurality of application containers 122-1 to 122-3 of the sidecar containers 121-2 to 121-4 decide to close the entire job, the plurality of sidecar containers 121-2 to 121-4 may periodically execute the checkpointing process, and the information about the state of the application container extracted through checkpointing may be stored in the storage nodes 130 as the most recent information about the state. When the entire job is finished, the corresponding sidecar container may be removed together with the corresponding application container.

Figure 4:
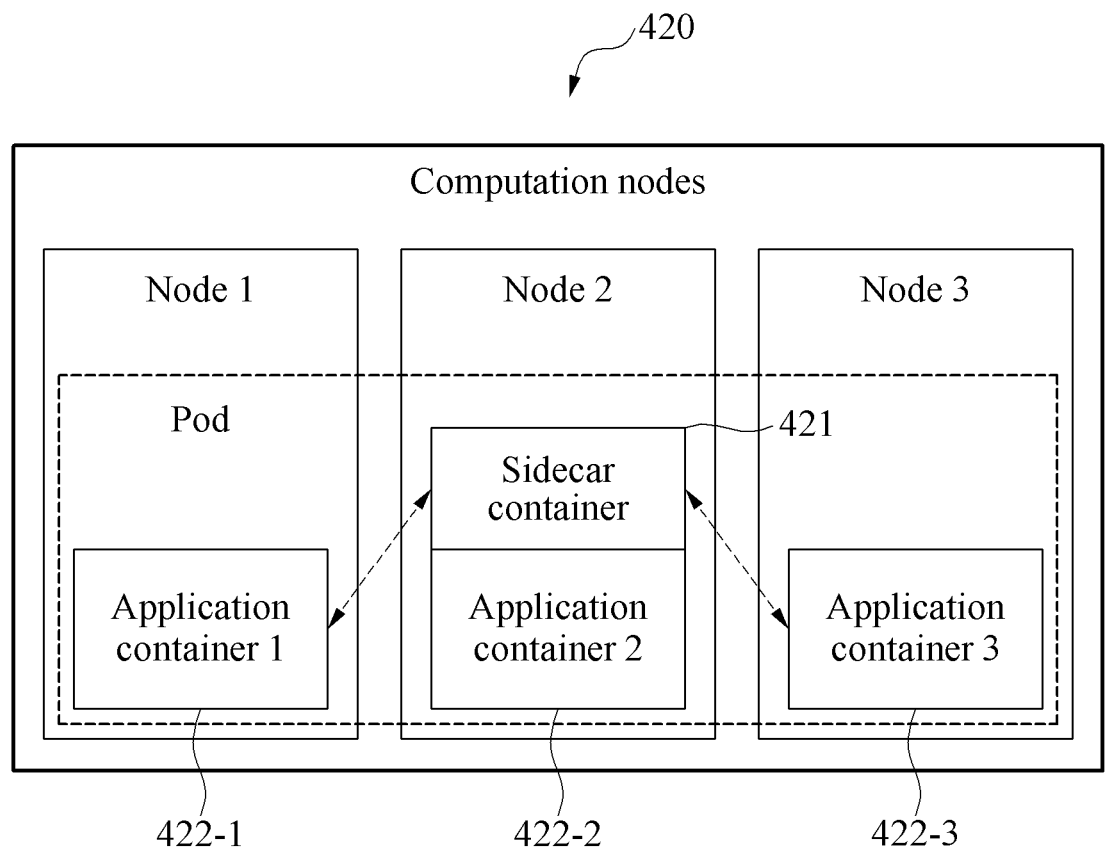
FIG. 4 illustrates computation nodes forming a pod according to one or more embodiments.

FIG. 4 illustrates computation nodes forming a pod according to one or more embodiments.

As illustrated in FIG. 4, one or more blocks and a combination thereof may be implemented by a special-purpose hardware-based computer that performs a predetermined function, or a combination of computer instructions and special-purpose hardware where the special purpose hardware is configured by execution of the computer instructions by one or more processors, for example.

The description with reference to FIGS. 1 to 3 may be applied to the description with reference to FIG. 4, and repeated descriptions may be omitted. For example, the computing device may be any one of the high performance computers of FIGS. 1-3.

Referring to FIG. 4, a computation node 420 according to an example may include job nodes node 1 to node 3. Each of the job nodes 1 to 3 may include application containers 422-1 to 422-3. Node 2 may also include a sidecar container 421.

A pod according to an example may include the sidecar container 421 and the application containers 422-1 to 422-3. In FIG. 4, one pod is illustrated as including three application containers 422-1 to 422-3 and one sidecar container 421, but is not limited to the described example.

The scheduler nodes 110 according to an example may distribute jobs in the unit of small pods. The scheduler nodes 110 may distribute the sidecar container 421 and the plurality of application containers 422-1 to 422-3 so that one sidecar container 421 may be in charge of the plurality of adjacent application containers 422-1 to 422-3. That is, one sidecar container may be in charge of the plurality of application containers of the job nodes, and the sidecar containers included in each unit of the small-scale pod may communicate with each other.

The sidecar container 421 according to an example may be in charge of the plurality of application containers 422-1 to 422-3. The application containers 422-1 to 422-3 for processing similar jobs may be grouped into one pod and may be controlled by one same sidecar container 421.

For example, the sidecar container 421 according to an example may communicate with a sidecar container of another pod (not shown) to perform the C/R process.

Using the method of FIG. 4 described above, it is possible to reduce the resources used by the sidecar container, and when a relatively small job is executed in the computation node, the resource used by the sidecar container may be reduced to efficiently perform the job.

Figure 5:
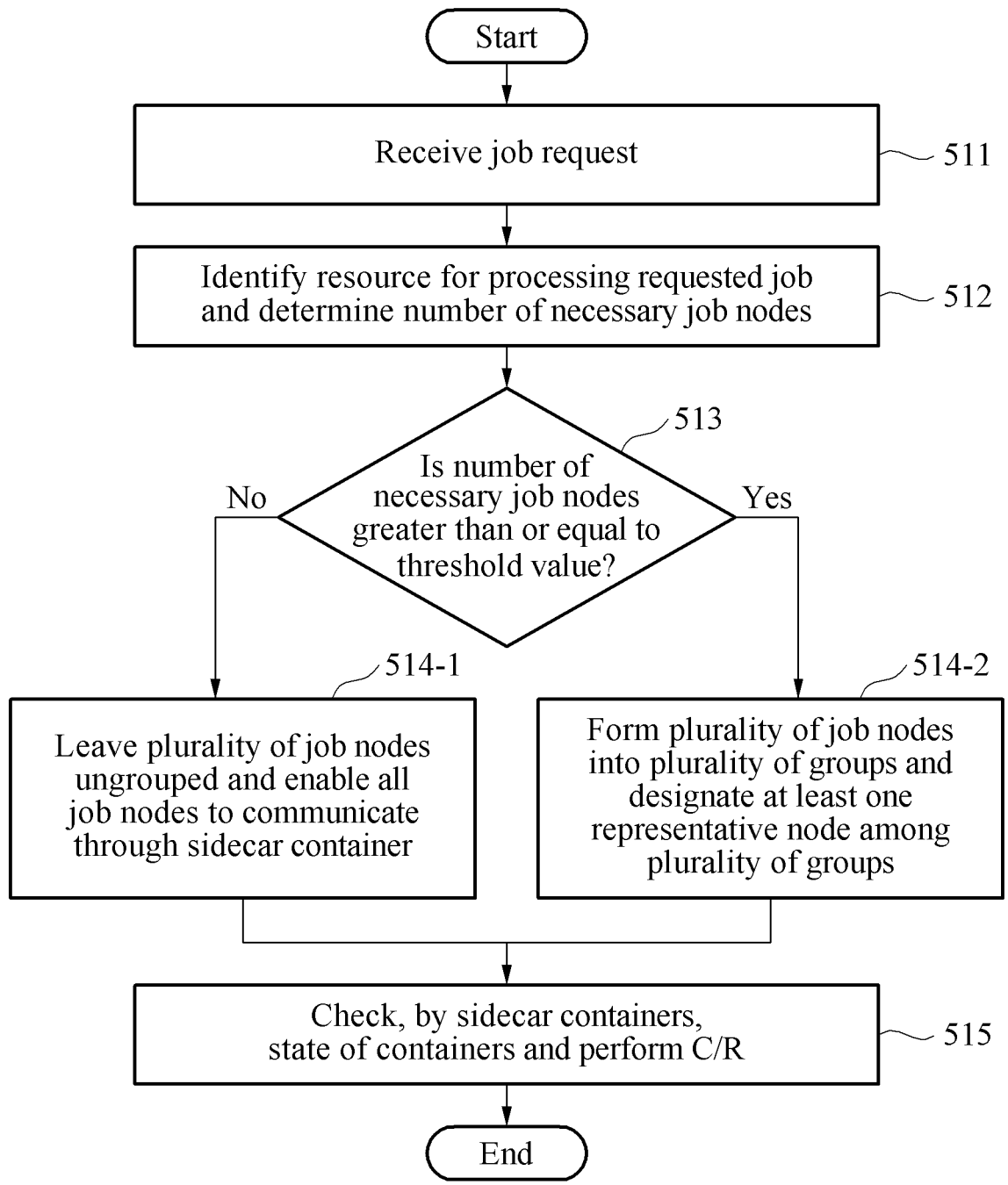
FIG. 5 illustrates a control method of the computation nodes in a computer device according to one or more embodiments.

FIG. 5 illustrates a control method of the computation nodes in a computer device according to one or more embodiments.

Referring to FIG. 5, operations 511 to 515 may be performed by the high-performance computer described with reference to FIGS. 1 to 3, and the description with reference to FIGS. 1 to 3 may be applied to the description with reference to FIG. 5. Repeated descriptions may be omitted. For example, the computing device may be any one of the high performance computers of FIGS. 1-4.

The operations of FIG. 5 may be performed in the order and manner as illustrated. However, the order of some operations may be changed, or some operations may be omitted, without departing from the spirit and scope of the shown example. The operations shown in FIG. 5 may be performed in parallel or simultaneously.

In operation 511, a computer device, e.g., a high-performance computer, according to an example may receive a job request from the scheduler nodes 110.

In operation 512, the scheduler nodes 110 of the computer device according to an example may identify a resource for processing the requested job and determine the number of necessary job nodes.

In operation 513, the scheduler nodes 110 of the computer device according to an example may determine whether the number of necessary job nodes is greater than or equal to a threshold value.

In operation 514-1, the scheduler nodes 110 of the computer device according to an example, when the number of necessary job nodes is less than the threshold value, may leave the plurality of job nodes ungrouped and enable all job nodes to communicate through the sidecar container.

In operation 514-2, the scheduler nodes 110 of the computer device according to an example, when the number of necessary nodes is greater than or equal to the threshold value, may form the plurality of job nodes into a plurality of groups and designate at least one representative node among the plurality of groups. The at least one representative node according to an example may enable sidecar containers included in the at least one representative node to communicate with the sidecar containers included in the representative nodes of another group. As described above, these sidecar containers may have control over their respective application containers. Operation 514-2 will be described in detail below with reference to FIG. 6.

In operation 515, the sidecar containers of the computer device according to an example may check the state of the containers and perform C/R.

Figure 6:
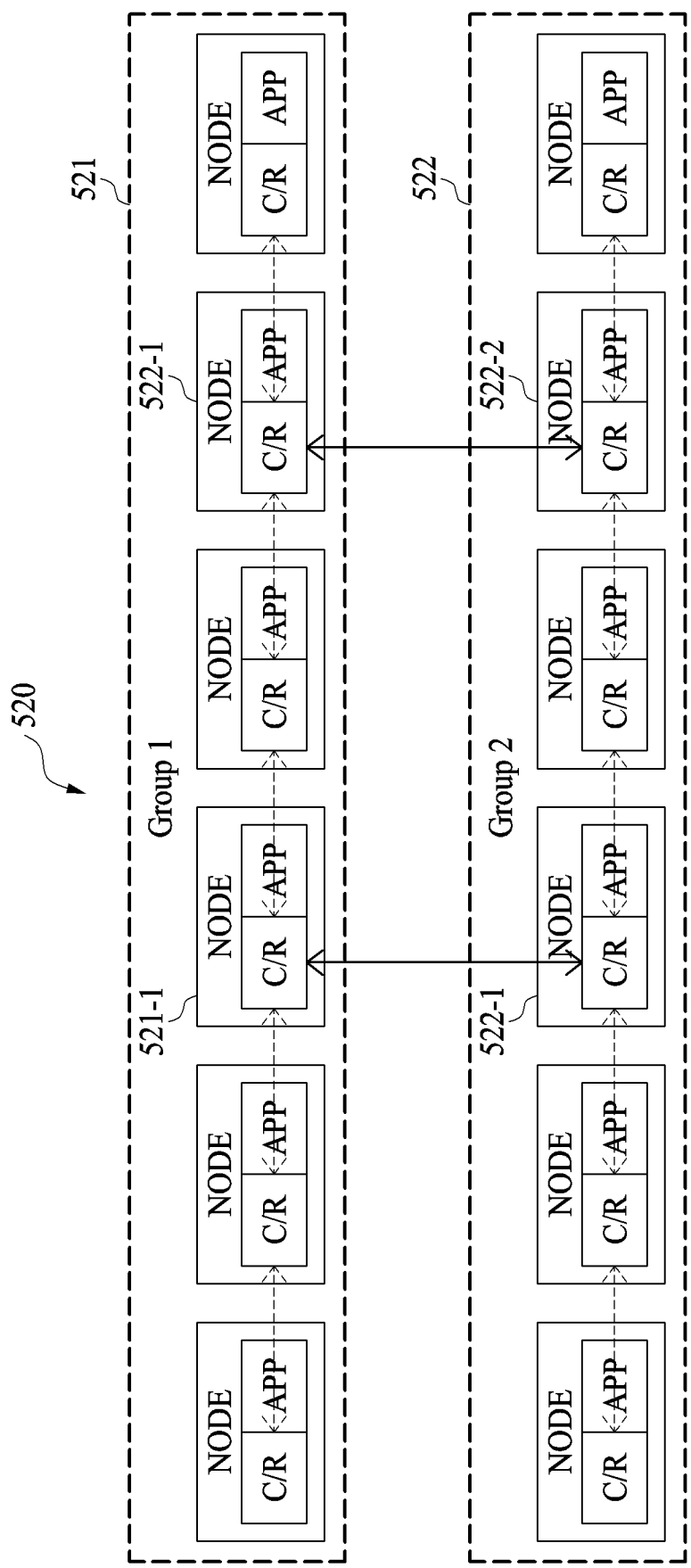
FIG. 6 illustrates the computation nodes forming a group according to one or more embodiments.

FIG. 6 illustrates the computation nodes forming a group according to one or more embodiments.

The description with reference to FIGS. 1 to 3 and FIG. 5 may be applied to the description with reference to FIG. 6, and repeated descriptions may be omitted.

As illustrated in FIG. 6, one or more blocks and a combination thereof may be implemented by a special-purpose hardware-based computer that performs a predetermined function, or a combination of computer instructions and special-purpose hardware where the special purpose hardware is configured by execution of the computer instructions by one or more processors, for example.

Referring to FIG. 6, a computation node 520 according to an example may include a first group 521 and a second group 522. For example, the computation node 520 may be implemented in a computing device such as any one of the high performance computers of FIGS. 1-4.

The first group 521 according to an example may include a plurality of job nodes, and each of the plurality of job nodes may include a sidecar container performing C/R and an application container (APP). At least one of representative nodes 521-1 to 521-2 may be designated as a representative node from among the plurality of job nodes of the first group 521.

The second group 522 according to an example may include a plurality of job nodes, and each of the plurality of job nodes may include a sidecar container and an application container. At least one of representative nodes 522-1 to 522-2 may be designated as a representative node from among the plurality of job nodes of the second group 522.

For example, when the job assigned to the scheduler nodes 110 is large, a large number of the plurality of job nodes may be necessary. If all of the sidecar containers are distributed to a large number of nodes and required to communicate with each other, an increase in overhead, which increases with the communication load, may occur. The scheduler nodes 110 may group the plurality of job nodes in the computation node 520, designate representative nodes 521-1 and 521-2 to the first group 521, and designate representative nodes 522-1 and 522-2 to the second group 522. Job nodes inside each group may communicate with each other through each sidecar container and may check the state of each container and perform checkpointing. The representative node 521-1 may communicate with the representative node 522-1, and the representative node 521-2 may communicate with the representative node 522-2. In an example, each of the representative nodes may have a same checkpointing time or perform checkpointing at similar or same intervals. In addition, when a job error occurs inside another group, the representative nodes may communicate so that the job of the entire group may be stopped.

Although the example of the present disclosure discloses two groups, each with six job nodes and two representative nodes, a number of groups, a number of job nodes, and a number of representation nodes are not limited to the described example.

In examples employing the grouping method described above, a communication overhead caused by distributing the job and C/R may be reduced, and the job efficiency may be increased.

The processors, receivers, memories, and servers, including the hardware performing the operations of the scheduler nodes 110, the computation nodes 120, and the storage nodes 130 for any of the computing devices of FIGS. 1-4 and 6 described herein and disclosed herein described with respect to FIGS. 1-6 are implemented by or representative of hardware components. As described above, or in addition to the descriptions above, hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. As described above, or in addition to the descriptions above, examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-rEs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor implemented method, the method comprising:
   for each of a plurality of job nodes, corresponding to a job request of a scheduler node,
   distributing an application container and a sidecar container of a corresponding job node of the plurality of job nodes; and
   storing, by the sidecar container, information about a state of the application container in a memory through a communication between the sidecar container and at least one sidecar container of another job node of the plurality of job nodes.

2. The method of claim 1, further comprising:
   detecting for an error, by checkpointing performed by one or more of the sidecar containers, based on at least one communication of the communications; and
   performing a restart in response to the detected error.

3. The method of claim 2, wherein the performing of the restart comprises:
   stopping an ongoing job in response to the detected error within a respective one of an application container and sidecar container of one job of the plurality of job nodes;
   requesting an allocation of a new node to the scheduler node; and
   performing, by the scheduler node, a migration of the one application container and the one sidecar container to the new node.

4. The method of claim 3, wherein the performing of the restart further comprises:
   first loading, for each remaining job node other than the one job, the stored information in the memory about the state of the application container, and
   second loading, by a corresponding sidecar container of the new node, the information about the state of the migrated one application container from the memory.

5. The method of claim 4, further comprising securing the plurality of job nodes in response to the job request,
   wherein the performing of the restart further comprises restarting the remaining nodes and the new node upon completion of the first and second loadings.

6. The method of claim 1, wherein the distributing, for each of the plurality of job nodes, of the application container and the sidecar container comprises setting the application container and the sidecar container so that the application container and the sidecar container perform a job independently of respective application containers of remaining job nodes other than a job node that includes the application container and the sidecar container.

7. The method of claim 1, wherein the distributing, for each of the plurality of job nodes, comprises:
   forming at least one pod respectively including at least one job node of the plurality of job nodes; and
   designating, to each of the at least one pod, a corresponding sidecar container in charge of at least one adjacent application container.

8. The method of claim 1, further comprising:
   determining whether a number of the plurality of job nodes is greater than or equal to a threshold value; and
   forming the plurality of job nodes into a plurality of groups in response to the number of the plurality of job nodes being greater than or equal to the threshold value, and
   designating at least one representative node among the plurality of groups,
   wherein respective sidecar containers included, by the distributing, in the at least one representative node are configured to communicate with respective other sidecar containers included in representative other nodes of another group.

9. The method of claim 1, wherein the storing, for each of the plurality of job nodes, of the information about the state of the application container comprises sharing and storing the information about the state of the application container and information about a state of the sidecar container both in a same memory.

10. A non-transitory computer-readable storage medium storing instructions that, when executed by a processor, cause the processor to perform the method of claim 1.

11. An electronic device system, comprising:
    one or more memories;
    one or more processors, that operate as a scheduler node, configured to transmit a job request; and
    the one or more processors or other one or more processors, that operate as computation nodes, configured to secure a plurality of job nodes based on the job requests received from the scheduler node, and
    for each of a plurality of job nodes corresponding to the job request:
    distribute an application container and a sidecar container corresponding to the application container, with the distributed sidecar container being configured to communicate with another sidecar container of at least one other job node of the plurality of job nodes; and
    store information about a state of the application container in the one or more memories.

12. The electronic device system of claim 11, wherein the sidecar container is configured to detect a failure through the communication and perform a restart.

13. The electronic device system of claim 11, wherein the sidecar container comprises a container provisioned with a programming language that is different from a corresponding application container.

14. The electronic device system of claim 12, wherein the sidecar container is configured to stop an ongoing job and request an allocation of a new node to the scheduler node in response to an error occurring, and
wherein the scheduler node is configured to perform a migration to the new node and perform the restart.

15. The electronic device system of claim 14, wherein the sidecar container is configured to perform a migration in which information about a state of the application container is loaded from the one or more memories to the new node.

16. The electronic device system of claim 12, wherein the scheduler node is configured to set the application container and the sidecar container so that the application container and the sidecar container perform a job independently.

17. The electronic device system of claim 12, wherein the scheduler node is configured to:
form at least one pod including the job nodes; and
designate the sidecar container in charge of at least one adjacent application container to the at least one pod.

18. The electronic device system of claim 12, wherein the scheduler node is configured to:
determine whether a number of the plurality of job nodes is greater than or equal to a threshold value;
form the plurality of job nodes into a plurality of groups in response to the number of the plurality of job nodes being greater than or equal to the threshold value; and
designate at least one representative node among the plurality of groups, and
wherein sidecar containers included in the at least one representative node are configured to communicate with sidecar containers included in representative nodes of another group.

19. The electronic device system of claim 12, wherein the computation nodes are configured to share and store the information about the state of the application container and information about a state of the sidecar container in a same storage unit.

* * * * *